Patented July 12, 1949

2,476,263

UNITED STATES PATENT OFFICE 2,476,263

METHOD FOR THE MANUFACTURE OF COBALT CARBONYL

Charles H. McKeever, Glenside, Pa., assignor to Rohm & Haas Company, Philadelphia, Pa., a corporation of Delaware No Drawing. Application November 22, 1947, Serial No. 787,615

8 Claims. (Cl. 23—203)

This invention relates to new and useful improvements in the manufacture of cobalt carbonyl. More particularly, it relates to a process wherein cobalt carbonate, hydroxide, or basic carbonate is suspended in a neutral organic liquid and converted to cobalt carbonyl by reaction with carbon monoxide under pressure and heat.

It has been known heretofore to prepare cobalt tetracarbonyl by the reaction of cobalt metal and carbon monoxide. Such a process, however, requires the preparation of cobalt metal in a finely divided, activated form and yields the carbonyl in the solid form, which is relatively unstable and difficult to handle and transport.

These difficulties are overcome by the process of this invention, which comprises suspending a cobalt compound or a mixture of compounds from the group consisting of cobalt carbonate, cobalt hydroxide, and cobalt basic carbonate in a neutral organic liquid and reacting said suspended cobalt compound with carbon monoxide at temperatures above about 140° C. under superatmospheric pressure.

The suspension of cobalt compound is prepared by merely mixing the organic liquid with one of the designated cobalt compounds or with a mixture of any two or all three of said compounds in a finely divided form. These three materials, which, when employed individually or as mixtures with one another, will be referred to as "initial cobalt compound" for the sake of convenience, may also be carried or precipitated on finely divided silicious materials in order to provide a larger surface for reaction with the carbon monoxide. Suitable extenders or carriers include infusorial or diatomaceous earth, activated carbon, neutral clays, and the like.

The suspension of cobalt compound in the organic liquid is then charged to a reaction vessel and reacted therein with carbon monoxide at elevated temperatures and superatmospheric pressures. While the process is independent of details in equipment, it has been found that fast and high conversion of the initial cobalt compound to cobalt carbonyl is effected when the reaction is carried out in a shaking bomb or autoclave charged with the suspended initial cobalt compound and carbon monoxide under pressure. The course of the reaction can be followed readily, in this case, by the fall in pressure as the carbon monoxide reacts to form the carbonyl. Alternatively, this invention may be carried out, continuously, for example, by dropping or spraying the liquid suspension of initial cobalt compound into a reaction vessel while carbon monoxide is also admitted continuously. A very convenient process involves spraying the suspension into a pressure chamber while carbon monoxide is passed through the suspension countercurrently. In such a case, compressed carbon monoxide may also be used to spray the suspension of cobalt compound.

While pure carbon monoxide may be employed, it is preferred that it be diluted with hydrogen. The presence of hydrogen not only accelerates the rate at which cobalt carbonyl is produced but it also makes for a higher yield of the latter. The ratio of carbon monoxide and hydrogen may be widely varied, and amounts of hydrogen from one quarter to four times the amount of carbon monoxide may be used, although it is preferred to use more practical amounts for the sake of efficiency. Such amounts of hydrogen are from one half to two times the amount of carbon monoxide.

A wide variety of organic liquids can be employed for suspending the initial cobalt compound, although, as might be expected, some operate more efficiently than others. The prime requirements of the organic liquid are that it be neutral and that it be also a solvent for cobalt carbonyl, since one of the objects of this invention is to prepare a solution of cobalt carbonyl which can be utilized to better advantage than the solid carbonyl formed by other processes. Inert organic liquids which are capable of dissolving as much as 5% to 15% of cobalt carbonyl are especially recommended as being suitable. The word "inert" is used in the accepted and recognized sense to indicate that the liquid does not undergo chemical reaction with the reactants employed to produce the cobalt carbonyl or with the cobalt carbonyl itself. While liquids having aliphatic unsaturation are normally avoided because they may react with carbon monoxide in the presence of hydrogen and the formed cobalt carbonyl to produce aldehydes and are, therefore, not inert in the accepted sense, they nevertheless may be employed. In such an instance, some carbon monoxide and hydrogen are consumed in converting the unsaturated liquid to an aldehyde, and the remainder or additional carbon monoxide reacts to form cobalt carbonyl which dissolves in the mixture of aldehyde and unsaturated liquid. The liquid must also be neutral, i. e., neither acidic or basic; and, therefore, compounds containing carboxyl or amino groups are excluded. Amides, however, such as propionamide, being neutral, are not excluded. Suitable inert neutral liquids may be exemplified by the following: Ketones, such as acetone, diethyl ketone, methyl ethyl ketone, methyl hexyl ketone, diisopropyl ketone, methyl isobutyl ketone, acetophenone, diphenyl ketone; alcohols, such as methyl, ethyl, isopropyl, isobutyl, tertiary butyl, isononyl, isoheptyl, benzyl, and dodecyl alcohols; esters, such as ethyl acetate, isobutyl acetate, tertiary amyl propionate, methyl formate, benzyl acetate, and isobutyl benzoate; ethers, such as diethyl ether, dibutyl ether, diisopropyl ether, dioxan, and diphenyl ether; hydrocarbons, such as isooctane, heptane, cyclohexane, methylcyclohexane, toluene, and benzene; aldehydes, such as heptaldehyde, butyraldehyde, propionaldehyde, isobutyraldehyde, isoamylaldehyde, laurylaldehyde, isononylaldehyde, and benzaldehyde; and other inert organic liquids, such as acetonitrile, ethylene dichloride, and chlorobenzene. Saturated hydrocarbons are ideal liquids from the standpoint of inertness, neutrality, and availability but do not hold so much cobalt carbonyl in solution as those liquids listed above. Ketones and ethers are the solvents of first choice while esters and alcohols are next preferred, and aldehydes, amides, and nitriles form a third class in order of preference.

The ratio of organic liquid to initial cobalt compound can be varied widely within reasonable limits. Sufficient liquid should be used to provide a fluid suspension of the cobalt compound, but amounts above fifteen times the weight of the initial cobalt compound do not appear to be justified. In fact, an amount of liquid equal to ten to twelve times the weight of the initial cobalt compound is preferred and recommended. As the carbonyl compound is formed, it dissolves in the liquid; and it has been found that the rate of formation of the carbonyl becomes definitely slower as the amount of cobalt carbonyl dissolved in the liquid approaches the saturation point. It may be said that the best yields of carbonyl are obtained in liquids which are the best solvents therefor, all other factors being constant, and that lower yields are obtained in poorer solvents. Furthermore, solutions containing 8% to 12% of cobalt carbonyl can be handled readily; and, accordingly, it is preferred to employ such amounts of inert organic liquid as will yield such solutions.

It is well known that cobalt carbonyl can be prepared from carbon monoxide and activated cobalt metal over a wide range of temperature and pressure. The same conditions can be employed in the process of this invention. Thus, temperatures above 300° C. can be used although, from a practical and economical standpoint, temperatures from 140° C. to 300° C. are preferred. Pressures as low as 150 pounds per square inch and as high as 10,000 pounds per square inch have been used. In fact, pressures above 10,000 pounds are not inoperative, but their use gives rise to practical difficulties, while those below 500 result in lower yields. For this reason, pressures from 500 to 5000 pounds per square inch are much preferred.

In addition to the fact that this process utilizes cobalt compounds of low cost rather than especially prepared cobalt metal, the process has the further advantage that the speed of reaction and the yield of carbonyl are of a high order. Yields of at least 80% are obtained, for example, in a matter of about two hours when the reaction is carried out batchwise in a shaking bomb.

Following are examples which serve to illustrate this invention:

*Example 1*

Into a shaking bomb were charged two hundred cc. of diisopropyl ether and fourteen grams of cobalt carbonate precipitated on six grams of diatomaceous earth. The bomb was flushed with carbon monoxide and then charged to 2600 pounds of pressure with a mixture of equal parts of carbon monoxide and hydrogen. Shaking was begun, and the temperature was raised to 160° C. in thirty minutes and was held at this point for two hours. The bomb and contents were then cooled to 20° C., the bomb was vented, and the liquid was decanted. The product was a dark brown, clear liquid containing 9.8% of cobalt carbonyl.

In similar manner, solutions of cobalt carbonyl were prepared from cobalt hydroxide suspended in isooctane and cobalt basic carbonate suspended in methyl ethyl ketone.

*Example 2*

Into a shaking bomb were charged two hundred cc. of diethyl ether and fourteen grams of cobalt carbonate precipitated on six grams of diatomaceous earth. The bomb was flushed with carbon monoxide and then charged to 2600 pounds of pressure with carbon monoxide. Shaking was begun, and the temperature was raised to 160° C. in thirty minutes and was held at this point. After an induction period of about forty-five minutes, the consumption of carbon monoxide began and continued for five hours, after which the bomb and contents were cooled to 20° C. The decanted liquid was clear and brown and contained 3.2% of cobalt carbonyl.

Further aspects of the material herein disclosed are described in my copending application Serial No. 787,616, filed November 22, 1947.

I claim:

1. A process for the preparation of cobalt carbonyl which comprises suspending a finely divided cobalt compound from the group consisting of cobalt carbonate, cobalt basic carbonate, and cobalt hydroxide in a neutral organic liquid which is a solvent for cobalt carbonyl and reacting said cobalt compound with carbon monoxide at a temperature above 140° C. and under superatmospheric pressure.

2. A process for the preparation of cobalt carbonyl which comprises suspending a finely divided cobalt compound from the group consisting of cobalt carbonate, cobalt basic carbonate, and cobalt hydroxide in a neutral organic liquid which is a solvent for cobalt carbonyl and reacting said cobalt compound with carbon monoxide at a temperature above 140° C. and under superatmospheric pressure in the presence of hydrogen in an amount from one quarter to four times the amount of carbon monoxide.

3. A process for the preparation of cobalt carbonyl which comprises suspending a finely divided cobalt compound from the group consisting of cobalt carbonate, cobalt basic carbonate, and cobalt hydroxide in a neutral organic liquid which is a solvent for cobalt carbonyl and reacting said cobalt compound with carbon monoxide at a temperature above 140° C. and under superatmospheric pressure in the presence of hydrogen in an amount from one half to two times the amount of carbon monoxide.

4. A process for the preparation of cobalt carbonyl which comprises suspending a finely divided cobalt compound from the group consisting of cobalt carbonate, cobalt basic carbonate, and cobalt hydroxide in a neutral and inert organic liquid which is a solvent for cobalt carbonyl and reacting said cobalt compound with carbon monoxide at a temperature above 140° C. and under superatmospheric pressure.

5. A process for the preparation of cobalt carbonyl which comprises suspending a finely divided cobalt compound from the group consisting of cobalt carbonate, cobalt basic carbonate, and cobalt hydroxide in a neutral organic liquid which is a solvent for cobalt carbonyl and reacting said cobalt compound with carbon monoxide at a temperature from 140° C. to 300° C. and under a pressure of 500 to 5000 pounds per square inch.

6. A process for the preparation of cobalt carbonyl which comprises suspending cobalt carbonate in a neutral organic liquid which is a solvent for cobalt carbonyl and reacting said cobalt carbonate with carbon monoxide at a temperature from 140° C. to 300° C. and under a pressure of 500 to 5000 pounds per square inch.

7. A process for the preparation of cobalt carbonyl which comprises suspending cobalt basic carbonate in a neutral organic liquid which is a solvent for cobalt carbonyl and reacting said cobalt basic carbonate with carbon monoxide at a temperature from 140° C. to 300° C. and under a pressure of 500 to 5000 pounds per square inch.

8. A process for the preparation of cobalt carbonyl which comprises suspending cobalt hydroxide in a neutral organic liquid which is a solvent for cobalt carbonyl and reacting said cobalt hydroxide with carbon monoxide at a temperature from 140° C. to 300° C. and under a pressure of 500 to 5000 pounds per square inch.

CHARLES H. McKEEVER.

No references cited.